United States Patent [19]

Hosoya et al.

[11] 4,311,042

[45] Jan. 19, 1982

[54] FUEL CONTROL MEASURING APPARATUS FOR INTERNAL COMBUSTION ENGINE

[75] Inventors: Katsumi Hosoya; Shunichi Kadowaki, both of Yokohama, Japan

[73] Assignee: Nissan Motor Company, Limited, Kanagawa, Japan

[21] Appl. No.: 103,479

[22] Filed: Dec. 14, 1979

[30] Foreign Application Priority Data

Dec. 22, 1978 [JP] Japan .................... 53-177960[U]

[51] Int. Cl.³ .............................................. G01F 1/68
[52] U.S. Cl. ........................................ 73/118; 73/204; 123/478
[58] Field of Search .................... 73/116, 118, 204; 123/478, 472

[56] References Cited

U.S. PATENT DOCUMENTS

| 3,564,915 | 2/1971 | Tomota et al. | 73/861.22 |
| 4,051,818 | 10/1977 | Volckers | 123/478 X |
| 4,210,016 | 7/1980 | Peter et al. | 73/116 |

Primary Examiner—Jerry W. Myracle
Attorney, Agent, or Firm—Lowe, King, Price & Becker

[57] ABSTRACT

Apparatus for controlling the supply of fuel to an internal combustion engine. The apparatus includes a hot-wire air flow meter and a smoothing circuit connected electrically to the output of the flow meter, said circuit eliminating pulsations present in the output signal of the flow meter, thereby preventing corresponding fluctuations in the air-fuel ratio of the mixture admitted to the engine.

21 Claims, 8 Drawing Figures

FUEL CONTROL MEASURING APPARATUS FOR INTERNAL COMBUSTION ENGINE

BACKGROUND OF THE INVENTION

The present invention relates to an apparatus for controlling the supply of fuel to an internal combustion engine, and more particularly to such an apparatus of the type using a hot-wire air flow meter.

A hot-wire air flow meter is being developed for measuring the flow rate of intake air into an internal combustion engine to control the supply of fuel into the engine. A constant temperature type hot-wire device is composed of an automatic balancing bridge circuit which measures the flow rate of air passing over a hot wire constituting one branch of the bridge circuit as a change in the electric current flowing through the hot wire. Since, however, the hot wire of this type of flow meter responds very rapidly to a change in the flow rate of the air passing over the wire, fluctuations or pulsations of a high frequency several times as high as the average rotational speed of the engine in the flow of the intake air, which are caused by opening and closing the intake valves of the engine, will create corresponding fluctuations in the output of the flow meter. The output signal of a flow meter of this type is sampled for use in controlling the supply of fuel using an electronic fuel injection device. Thus pulsations in the output signal of the flow meter will cause corresponding fluctuations in the air-fuel ratio. The fluctuations in the air-fuel ratio adversely affect the performance of the engine, the consumption of fuel, the composition of exhaust gas, etc. It is difficult to eliminate the fluctuations which can severely impair the response of a prior art mixture ratio control which detects the concentration of oxygen in the exhaust gas for feedback control, because of a relatively slow response speed of the control.

SUMMARY OF THE INVENTION

It is therefore an object of the present invention to provide an apparatus for controlling the supply of fuel to an internal combustion engine, which reduces fluctuations in the mixture ratio.

Another object is to provide for controlling the supply of fuel to an internal combustion engine an apparatus which has a suitable speed of response to fluctuations in the flow rate of intake air.

According to the present invention, there is provided apparatus for controlling the supply of fuel to an internal combustion engine with an air intake passage thereto and fuel input control means, comprising:

(a) a hot-wire air flow meter whose hot wire is adapted to be disposed within the air intake passage; and (b) a smoothing circuit connected to the output of the air flow meter for eliminating fluctuations of a relatively high frequency in the output signal of the flow meter whereby corresponding fluctuations in the air flow signal input to the fuel input control means are removed.

Other objects, features and advantages of the present invention will be apparent from the following description when taken in conjunction with the accompanying drawings.

DESCRIPTION OF THE PREFERRED EMBODIMENTS

Figure 1:
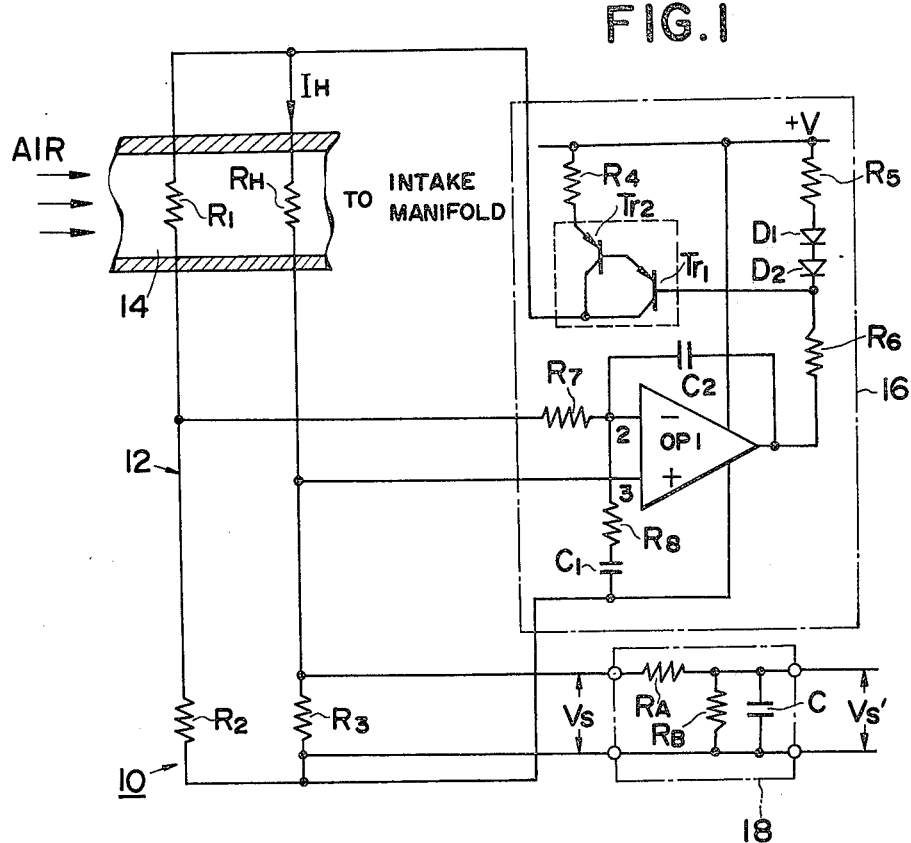
FIG. 1 is a schematic diagram of a preferred embodiment of apparatus for controlling the supply of fuel to an internal combustion engine according to the present invention, associated with an intake passage to the engine.

Any single reference numeral is used to designate the same or similar parts or elements throughout the drawings.

Referring to FIG. 1, the apparatus according to the present invention, designated generally by 10, includes a constant temperature type hot-wire air flow meter 12. It should be noted that in other embodiments of the present invention, different types of flow meter may be used. A hot wire Rh and a resistor $R_1$ of the meter 12 are disposed within an intake passageway or pipe 14 to an intake manifold, not shown, the resistance of both the hot wire Rh and the resistor $R_1$ changing according to the temperature of the air flowing through the passageway 14. Thus changes in the temperature of the air flowing in the intake pipe 14 are compensated for. The flow meter 12 takes the form of an automatic balancing resistor bridge circuit which consists of the hot wire Rh as a resistor, resistors $R_1$, $R_2$ and $R_3$, and a control circuit 16. The resistors $R_2$ and $R_3$ are of constant resistance and the resistors are selected so that $R_1$ and $R_2$ each have a considerably higher resistance than either of Rh and $R_3$. In this flow meter 12, an electric current Ih flows from the control circuit 16 to the hot wire Rh of the bridge circuit. When the intake air flow through the intake pipe 14 increases, the amount of heat dissipated from the hot wire Rh will increase. The control circuit 16 of the automatic balancing bridge circuit 12 will increase the voltage across the hot wire to increase the power dissipated by the hot wire so that the temperature, and therefore the resistance, of the hot wire is in fact maintained at a constant value. This feedback mechanism balances the bridge and maintains a voltage across the series circuit of Rh and $R_3$, and thus a proportional voltage Vs across the resistor $R_3$, corresponding to the flow rate of the intake air in the intake passageway 14. The control circuit 16 includes an integrating circuit which in turn includes an operational amplifier $OP_1$, an input resistor $R_7$ between the inverting input 2 of the amplifier $OP_1$ and the junction point between the resistors $R_1$ and $R_2$, a capacitor $C_2$ between inverting input 2 and output of the amplifier $OP_1$, and a load resistor $R_6$ between the output of amplifier $OP_1$ and transistors $Tr_1$ and $Tr_2$ connected in Darlington. The output of the amplifier $OP_1$ is thus responsive to the resistors $R_H$ and $R_1$ of the bridge circuit.

The ends of the resistor $R_3$, which provide the output of the flow meter 12, are connected to a smoothing circuit consisting of a low-pass filter 18 that includes resistors Ra and Rb and a capacitor C. The output of the flow meter 12 contains pulsations corresponding to rapid fluctuations in the flow rate of intake air. However, these pulsations are eliminated by the low-pass filter 18 thereby providing a smoothed output. If the input voltage and the output voltage of the filter 18 are Vs and Vs', the dividing ratio K in the steady-state is given by K=Vs'/Vs=Rb/(Ra+Rb) where Ra and Rb each also represent a resistance value. The resistors Ra and Rb are selected so that Ra and Rb each have a considerably higher resistance than $R_3$ in order to avoid any adverse influence on the balance characteristics of the flow meter 12. The time constant $$t\left(=C\cdot\frac{Ra\cdot Rb}{Ra+Rb}\right)$$

where C also represents a capacity) is selected such that t>T which is the maximum possible period of a pulsation in the intake of air admitted into the engine. The upper limit of the time constant t is any value which does not impair the smooth operation of the engine. In the particular embodiment, the time constant $\tau$ is preferably in the range of 30 to 100 milliseconds.

Figure 2:
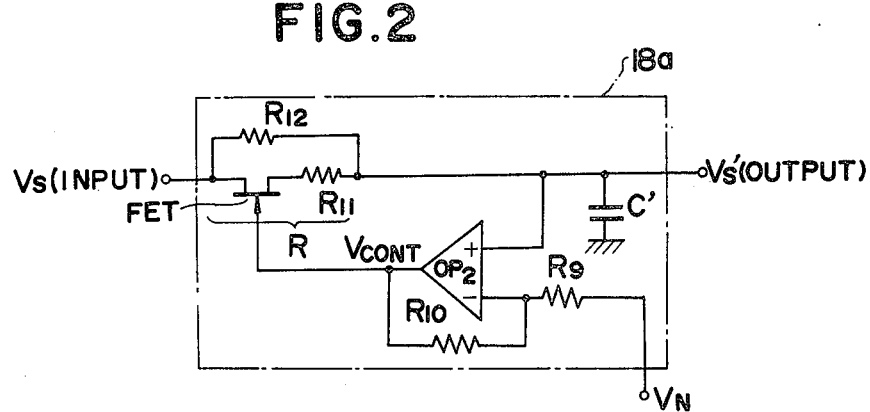
FIG. 2 shows another form of a low pass filter of FIG. 1.
Figure 3:
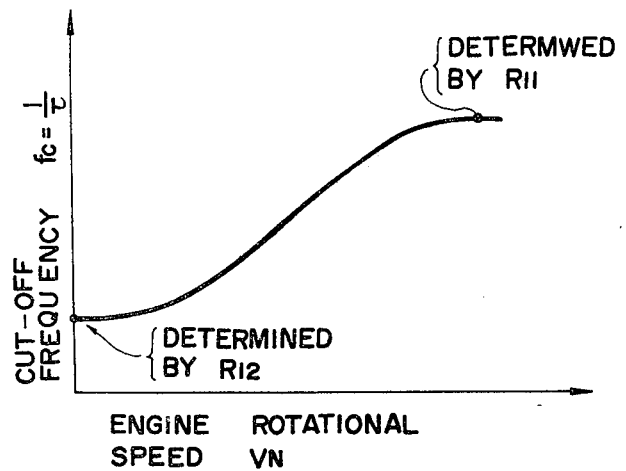
FIG. 3 is a graph showing the relationship between a voltage representing the rotational speed of the engine and the cut-off frequency of the low pass filter of FIG. 2.

FIG. 2 shows another low pass filter 18a which can be used instead of the filter 18 in FIG. 1. The time constant $\tau$ this low pass filter which is defined by a resistance R and a capacitor C' is changed by changing the resistance R, that is, the source-drain impedance of a field effect transistor FET according to a voltage Vn directly proportional to the rotational speed of the engine and fed through an operational amplifier $OP_2$. This filter serves to control its cut-off frequency depending on the voltage Vn and therefore on the frequency of pulsations present in the intake air to the engine and to reduce pulsations in the intake air while maintaining the response speed of the filter. As will be seen from FIG. 3, the cut-off frequency of the filter increases as Vn increases, which decreases the source-drain impedance of FET.

Figure 4:
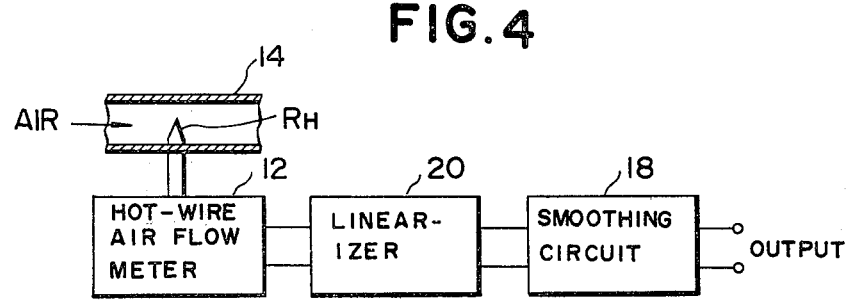
FIG. 4 is a modification of the present invention.

FIG. 4 shows a modification of the present invention, which uses a linearizer 20 whose input is electrically connected to the output of a flow meter 12 of the above type and whose output is electrically connected to the input of a low-pass filter 18. This linearizer 20 converts the output of the flow meter 12 to a value directly proportional to the flow rate of intake air admitted into the engine. Thus, a signal substantially proportional to the flow rate of the intake air, but of extremely reduced fluctuation, is obtained from the output of the filter 18.

Figure 5:
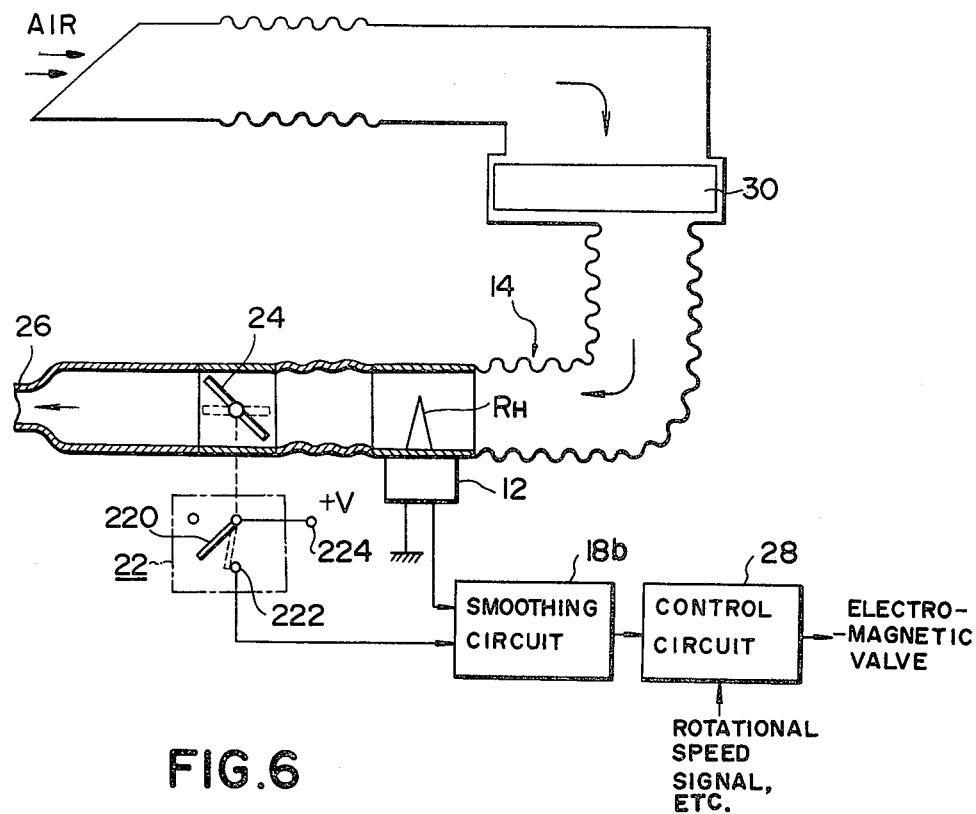
FIG. 5 is another modification of the present invention.
Figure 6:
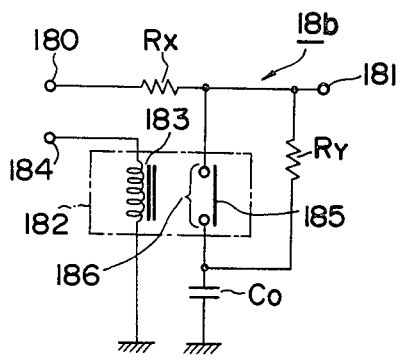
FIG. 6 is a detailed illustration of the filter in FIG. 5.

FIG. 5 shows a further modification of the present invention. This device includes a switch 22 interlocked with a throttle valve 24 provided within an intake passageway 14 leading to an intake manifold 26. The switch 22 has a movable contact 220 which is closed against its fixed contact 222 by the throttle valve 24 when this valve 24 is opened beyond a predetermined degree of opening such as shown by the broken lines in FIG. 5, thus supplying the voltage from terminal 224 to a smoothing circuit 18b which is best seen in FIG. 6. The flow meter 12 at all times supplies a signal to the smoothing circuit 18b. When the opening of the throttle valve 24 is smaller than the predetermined value, this signal passes without change through the smoothing circuit 18b to the next stage. When the throttle opening exceeds the predetermined value, current is conducted from the switch 22 to the smoothing circuit 18b which smooths the signal from the flow meter 12.

The smoothing circuit 18b includes a resistor Rx connecting the input 180 and the output 181 thereof, a resistor Ry in series with a capacitor Co which is electrically connected between the output terminal 181 and ground, and an electromagnetic relay 182 which includes an exciting coil 183 whose one end is electrically connected to another input 184 of the smoothing circuit 18b while the other end is electrically grounded, and a normally open contact 185 which is closed to fixed contacts 186 by the excitation of the coil 183 in order to short-circuit the resistor Ry. When the opening of the throttle valve 24 is smaller than the predetermined value, i.e. when the load on the internal combustion engine and pulsations in the intake air are small, the voltage is not applied to the input terminal 184. Thus the normally open contact 185 of the relay 183 is kept open thereby forming a circuit with the resistors Rx and Ry and the capacitor Co which has no smoothing action.

Figure 7A:
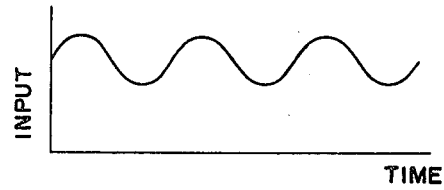
FIGS. 7A and 7B show an input and an output signal, respectively, of the filter in FIG. 4.
Figure 7B:
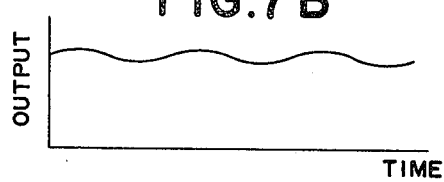

On the other hand, when the throttle valve 24 is opened larger than the predetermined value, i.e. when the engine load increases and pulsations in the intake air increase to such an extent that they cannot be neglected, the voltage is applied from the switch 22 to the terminal 184 to conduct an electric current through the exciting coil 183. This closes the normally open contact 185 against the fixed contacts 186 to short-circuit the resistor Ry, thereby forming a circuit of the resistor Rx and capacitor Co. This circuit functions to smooth any large pulsations in the flow meter signal conducted to the input terminal 180, such as shown in FIG. 7A, with the result that the output terminal 181 provides a substantially smooth signal such as shown in FIG. 7B. This output signal from the smoothing circuit 18 is fed to a control circuit 28, to which signals representing the rotational speed of the engine and other factors are also fed. Thus the control circuit 28 calculates the amount of fuel required for the engine from the signals representing the flow rate of intake air and the rotational speed of the engine, etc., and outputs a signal representing the required amount of fuel which controls the opening and closing of an electromagnetic valve (not shown) connected to a fuel supply line, thereby controlling the supply of fuel to the engine. Reference numeral 30 denotes an air filter in FIG. 5.

Thus, the apparatus according to the present invention acts effectively to reduce fluctuations which may be present in the output signal from a hot-wire air flow meter using a smoothing circuit, without impairing the substantial characteristics of the output signal. Thus the resultant signal serves to control the fuel supply to the engine in a substantially fluctuation-free fuel-air ratio.

The present invention has been described in terms of preferred embodiments, but of course various changes and omissions in the form and content thereof, which nevertheless remain within the scope of the present invention, will be clear to those skilled in the relevant art. For example, the function of the smoothing circuit to not operate when the throttle valve is opened less than a predetermined amount may be made responsive to more sophisticated criteria. It is undesirable for the smoothing circuit to operate during movement of the accelerator pedal, and a function to avoid such operation may easily be incorporated into the smoothing circuit.

What is claimed is:

1. Apparatus for controlling the supply of fuel to an internal combustion engine with an air intake passage thereto and fuel input control means, comprising:

(a) a hot-wire air flow meter whose hot wire is adapted to be disposed within the air intake passage; and (b) a smoothing circuit connected to the output of the air flow meter for eliminating fluctuations of a relatively high frequency in the output signal of the flow meter whereby corresponding fluctuations in the air flow signal input to the fuel input control means are removed;

wherein the smoothing circuit includes a lowpass filter which has a time constant that is longer than the period of pulsations appearing in the flow of intake air, and that is shorter than the response period of the fuel control means; and, wherein the low pass filter includes means for changing its cut-off frequency depending upon the rotational speed of the engine.

2. The apparatus of claim 1, further including a linearizer disposed between the flow meter and the smoothing circuit for converting the output of the flow meter to a signal representing the air intake flow rate.

3. Apparatus for controlling the supply of fuel to an internal combustion engine with an air intake passage thereto and fuel input control means, comprising:

(a) a hot-wire air flow meter whose hot-wire is adapted to be disposed within the air intake passage;

(b) a smoothing circuit connected to the output of the air flow meter for eliminating fluctuations of a relatively high frequency in the output signal of the flow meter whereby corresponding fluctuations in the air flow signal input to the fuel input control means are removed; and (c) filter control means for selectively actuating the smoothing circuit according to operating conditions of the internal combustion engine.

4. The apparatus of claim 3, wherein the air intake passage is provided with a throttle valve therein for controlling the flow rate of air into the engine, and wherein the smoothing circuit is activated if the opening of the throttle valve exceeds a predetermined value.

5. The apparatus of claim 4, wherein the smoothing circuit is composed of a resistor connecting the input and the output thereof, a series circuit of a resistor and a capacitor, the circuit being connected between the output and ground, and means for short-circuiting the resistor of the series circuit when the load on the engine is larger than a predetermined value.

6. The apparatus of claim 3, wherein the smoothing circuit includes a low-pass filter which has a time constant that is longer than the period of pulsations appearing in the flow of intake air, and that is shorter than the response period of the fuel input control means.

7. Apparatus for controlling the supply of fuel to an internal combustion engine with an air intake passage thereto and fuel input control means, comprising:

(a) a hot-wire air flow meter whose hot wire is adapted to be disposed within the air intake passage;

(b) smoothing circuit connected to the output of the air flow meter for eliminating fluctuations of a relatively high frequency in the output signal of the flow meter whereby corresponding fluctuations in the air flow signal intput to the fuel input control means are removed; and (c) a linearizer disposed between the flow meter and the smoothing circuit for converting the output of the flow meter to a signal representing the air intake flow rate.

8. The apparatus of claim 7, wherein the smoothing circuit includes a low-pass filter which has a time constant that is longer than the period of pulsations appearing in the flow of intake air, and that is shorter than the response period of the fuel input control means.

9. The apparatus of claim 18, wherein the time constant of the low-pass filter is in the range of 30 to 100 milliseconds.

10. Apparatus for measuring the flow rate of air, comprising:

(a) a hot-wire air flow meter whose hot wire is adapted to be exposed to the air to be measured, said flow meter including a bridge circuit which includes the hot wire as a branch, said bridge circuit including two diagonal junctions for producing an output thereacross, and a control circuit for receiving the output to apply the same to said bridge circuit so as to maintain the balance of said bridge circuit;

(b) a smoothing circuit connected to the output of the air flow meter for eliminating fluctuations of a relatively high frequency in the output signal of the flow meter whereby corresponding fluctuations in the air flow signal input to the fuel input control means are removed;

wherein the smoothing circuit includes a lowpass filter which has a time constant that is longer than the period of pulsations appearing in the flow of intake air, and that is shorter than the response period of the fuel input control means; and wherein the low pass filter includes means for changing its cut-off frequency depending upon the rotational speed of the engine.

11. The apparatus of claim 10, further including a linearizer disposed between the flow meter and the smoothing circuit for converting the output of the flow meter to a signal representing the air intake flow rate.

12. The apparatus of claim 10 or 11, wherein said control circuit includes an integrating circuit for integrating the output produced across the two diagonal junctions of the bridge circuit to produce a corresponding integration signal and an amplifier for amplifying the integration signal to apply same to the bridge circuit.

13. Apparatus for measuring the flow rate of air comprising:

(a) a hot-wire air flow meter whose hot wire is adapted to be exposed to the air to be measured, said flow meter including a bridge circuit which includes the hot wire as a branch, said bridge circuit including two diagonal junctions for producing an output thereacross, and a control circuit for receiving the output to apply the same to said bridge circuit so as to maintain the balance of said bridge circuit;

(b) a smoothing circuit connected to the output of the air flow meter for eliminating fluctuations of a relatively high frequency in the output signal of the flow meter whereby corresponding fluctuations in the air flow signal input to the fuel input control means are removed; and (c) filter control means for selectively actuating the smoothing circuit according to operating conditions of the internal combustion engine.

14. The apparatus of claim 13, further including an air intake passage through which the air whose flow rate is measured flows and a throttle valve therein for controlling the flow rate of air into the engine, and wherein the smoothing circuit is activated if the opening of the throttle valve exceeds a predetermined value.

15. The apparatus of claim 14, wherein the smoothing circuit is composed of a resistor connected between the input and the output thereof, a series circuit of a resistor and a capacitor, the series circuit being connected between the output and ground, and means for short-circuiting the resistor of the series circuit when the load on the engine is larger than a predetermined value.

16. The apparatus of claim 13, 14 or 15, wherein said control circuit includes an integrating circuit for integrating the output produced across the two diagonal junctions of the bridge circuit to produce a corresponding integration signal and an amplifier for amplifying the integration signal to apply same to the bridge circuit.

17. The apparatus of claim 13, wherein the smoothing circuit includes a low-pass filter which has a time constant that is longer than the period of pulsations appearing in the flow of intake air, and that is shorter than the response period of the fuel input control means.

18. Apparatus for measuring the flow rate of air comprising:
(a) a hot-wire flow meter whose hot wire is adapted to be exposed to the air to be measured, said flow meter including a bridge circuit which includes the hot-wire as a branch, said bridge circuit including two diagonal junctions for producing an output thereacross, and a control circuit for receiving the output to apply the same to said bridge circuit so as to maintain the balance of said bridge circuit;
(b) a smoothing circuit connected to the output of the air flow meter for eliminating fluctuations of a relatively high frequency in the output signal of the flow meter whereby corresponding fluctuations in the air flow signal input to the fuel input control means are removed; and
(c) a linearizer disposed between the flow meter and the smoothing circuit for converting the output of the flow meter to a signal representing the air intake flow rate.

19. The apparatus of claim 18, wherein the smoothing circuit includes a low-pass filter which has a time constant that is longer than the period of pulsations appearing in the flow of intake air, and that is shorter than the response period of the fuel input control means.

20. The apparatus of claim 19, wherein the time constant of the low-pass filter is in the range of 30 to 100 milliseconds.

21. The apparatus of claim 17, 18 or 20, wherein said control circuit includes an integrating circuit for integrating the output produced across the two diagonal junctions of the bridge circuit to produce a corresponding integration signal and an amplifier for amplifying the integration signal to apply same to the bridge circuit.

* * * * *